(No Model.)

J. B. NORTON.
BELT FASTENER.

No. 292,173. Patented Jan. 22, 1884.

Witnesses:
D. Walter Fowler
H. B. Applewhite

Inventor:
John B. Norton
by A. H. Evans & Co.

UNITED STATES PATENT OFFICE.

JOHN B. NORTON, OF PHILADELPHIA, PENNSYLVANIA.

BELT-FASTENER.

SPECIFICATION forming part of Letters Patent No. 292,172, dated January 22, 1884.

Application filed June 5, 1883. (No model.)

*To all whom it may concern:*

Be it known that I, JOHN B. NORTON, of Philadelphia and State of Pennsylvania, have invented certain Improvements in Belt-Fasteners; and I hereby declare the following to be a full, clear, and exact description thereof, reference being had to the accompanying drawings, making part of this specification, in which—

Figure 1:
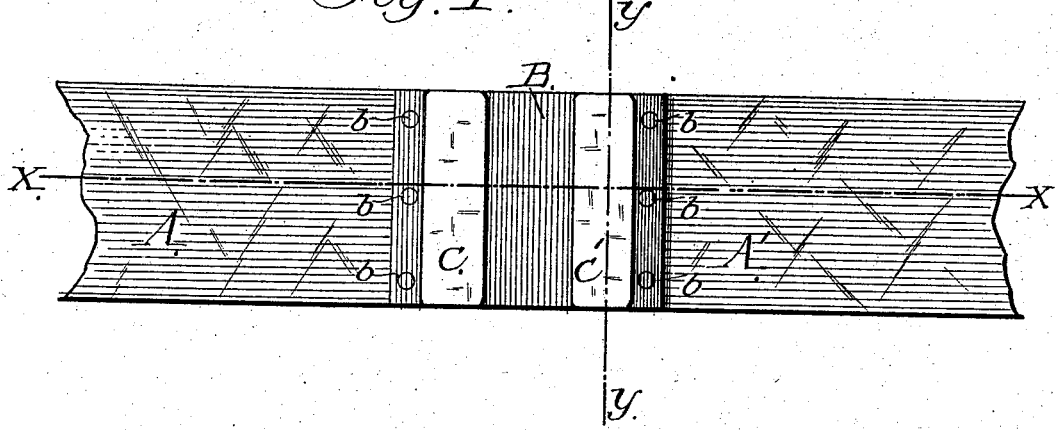
Figure 2:
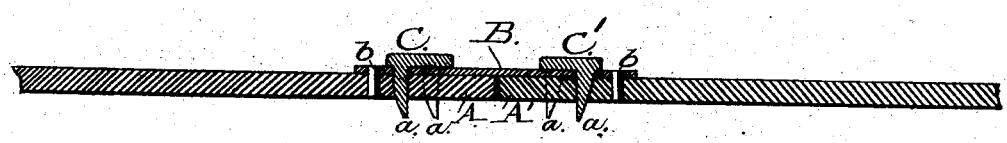
Figure 3:
Figure 4:
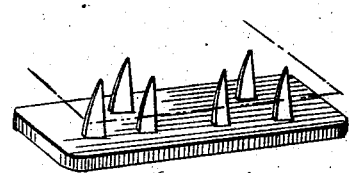

Figure 1 is a plan view of the fastener applied to a belt. Fig. 2 is a longitudinal section of the same. Fig. 3 is a transverse section of the same. Fig. 4 shows modifications of the teeth.

My invention relates to belt-fastenings wherein a joining-plate is used provided with a series of pins, which engage the meeting ends of the belting, said pins being upset to hold in the belting material. Fastening devices of this description heretofore made have been substantially rigid, and therefore could not be used successfully on small pulleys, for the reason that the fastening-plate strikes the pulley tangent to its circumference and ballots or hammers the pulley.

The object of my invention is to overcome this objection and produce a belt-fastening plate which will conform to the curvature of the pulley and pass smoothly and evenly around it.

My invention consists in an elastic or flexible steel plate which covers the meeting edges of the belt, in combination with two narrow heavier plates provided with teeth or projections to be upset, one of which is applied through the flexible plate and each end of the belt, thereby securing the flexible plate and the ends of the belting together in a yielding but substantial joint.

In order that those skilled in the art may make and use my invention, I will proceed to describe the manner in which I have carried it out.

In the said drawings, A and A' represent the meeting ends of the belt. Overlying these meeting ends is a flexible plate, B, made of steel or any other desirable material, which will yield to the curvature of the pulley as the belt passes around it. The flexible plate B is secured to each end of the belting by means of two independent plates, C C', provided with teeth *a a*, which are passed or driven through the flexible plate B and the ends A A' of the belt. The teeth *a a* are then upset in the usual manner, thereby securely fastening the belt ends together in such a manner that the flexible plate yields to the curvature of the pulley, and the heavy narrow plates do not injuriously affect the travel of the belt.

If desirable, there may be rivets *b b* put through the extreme ends of the flexible plate, as shown; but this may be omitted or some similar fastening substituted for the rivets without departing from the spirit of my invention.

Having thus described my invention, what I claim as new, and desire to secure by Letters Patent, is—

In a belt-fastening device, the flexible plate B, in combination with two independent plates, C C', provided with teeth *a a*, all constructed and arranged substantially as described.

JOHN B. NORTON.

Witnesses:
GEO. W. HANCOCK,
WM. E. LEVICK.